United States Patent
Hulyalkar (10) Patent No.: US 6,285,892 B1
(45) Date of Patent: Sep. 4, 2001

(54) DATA TRANSMISSION SYSTEM FOR REDUCING TERMINAL POWER CONSUMPTION IN A WIRELESS NETWORK

(75) Inventor: Samir N. Hulyalkar, Ossining, NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/198,708

(22) Filed: Nov. 24, 1998

(51) Int. Cl.7 .............................. H04B 7/00; H04M 11/00
(52) U.S. Cl. ........................ 455/574; 455/70; 455/500; 455/522; 455/526; 340/7.32; 370/311
(58) Field of Search ................................ 455/574, 500, 455/522, 526, 70, 38.3, 343, 132, 38.1, 31.1, 31.2, 31.3; 340/7.32; 370/311

(56) References Cited

U.S. PATENT DOCUMENTS

| | | | |
|---|---|---|---|
| 4,449,248 | * 5/1984 | Leslie et al. | 455/343 |
| 4,885,577 | * 12/1989 | Nelson | 340/825.44 |
| 5,297,144 | * 3/1994 | Gilbert et al. | 455/31.1 |
| 5,390,362 | * 2/1995 | Modjeska et al. | 455/32.1 |
| 5,684,859 | * 11/1997 | Chanroo et al. | 455/456 |
| 5,689,805 | * 11/1997 | Ayerst et al. | 455/32.1 |
| 5,930,681 | * 7/1999 | Snowden et al. | 455/574 |
| 5,991,281 | * 11/1999 | Hiramatsu | 455/38.3 |

OTHER PUBLICATIONS

PHA 23,206, U.S. Serial No. 08/770,024, Medium Access Control (MAC) Protocol for Wireless ATM.
PHA 23,536, U.S. Serial No. 09/193,435, "System for Establishing a Transmission Sequence for Plural WTs in a Wireless Network".

* cited by examiner

Primary Examiner—Lee Nguyen
Assistant Examiner—Simon Nguyen
(74) Attorney, Agent, or Firm—Daniel J. Piotrowski (57) ABSTRACT

The system transmits data between terminals of a wireless network. In the system, a base station/central controller ("BS/CC") controls transmission of data from a transmitting terminal to plural receiving terminals, where the data is ordered in slots of a control data frame ("CDF"), and where each slot is reserved for a data transmission between the transmitting terminal and a specific receiving terminal. Specifically, the BS/CC divides the plural receiving terminals into a set of power-saving terminals and a set of non-power-saving terminals, and then reserves a set of slots in the CDF for data transmission between the transmitting terminal and the power-saving terminals, and another set of slots in the CDF for data transmission between the transmitting terminal and the non-power-saving terminals. The BS/CC then issues a message over the wireless network instructing the power-saving terminals when to switch between a low-power mode and a data-receiving mode based on a location of the set of slots in the frame reserved for data transmission between the transmitter and the power-saving terminals.

8 Claims, 6 Drawing Sheets

FIG. 1

MSC  MOBILE SWITCHING CENTER
BS   BASE-STATION
WT   WIRELESS TERMINAL
G    GATEWAY

FIG. 2

KEYS: ⟷ WIRELESS CONNECTION
— WIRELINE CONNECTION
✕ SWITCH (ATM)

FIG. 3

WT   WIRELESS TERMINAL
 FOWARDING WT

DATA TRANSMISSION SYSTEM FOR REDUCING TERMINAL POWER CONSUMPTION IN A WIRELESS NETWORK

BACKGROUND OF THE INVENTION

1. Field of the Invention

The present invention is directed to a system for reducing power consumption of networked wireless terminals. In particular, the invention is directed to a system which divides the wireless terminals into sets, and which instructs the sets of terminals when to switch from a low-power mode to a data-receiving mode in order to receive data. The invention has particular utility in connection with wireless ATM networks, which specify transmitting and receiving terminals in a time-division multiple access frame, and which arbitrate access thereto using a central controller, base station, or the like.

2. Description of the Related Art

ATM ("asynchronous transfer mode") is a protocol which was developed to address problems associated with transmitting multimedia data between networked devices. In particular, ATM networks are systems that negotiate and establish transmission parameters (e.g., bandwidth) prior to connecting two networked devices, "packetize" different types of data (e.g., video and audio data) into cells based on the established transmission parameters, and then multiplex these cells so that they can be transmitted over a single communication line to a receiving device. The receiving device then checks the transmitted data for errors and, if any are present, requests retransmission of the data by the transmitting device.

Traditionally, ATM networks were wire-based, meaning that devices therein were interconnected using fiber optic cables or the like. Recently, however, wireless ATM networks have been developed which replace at least some of these fiber optic cables with point-to-point wireless connections, such as radio-frequency ("RF") and infrared ("IR") links. A wireless ATM network of this type is described in U.S. patent application Ser. No. 08/770,024, entitled "Medium Access Control (MAC) Protocol For Wireless ATM", the contents of which are hereby incorporated by reference into the subject application as if set forth herein in full.

Figure 1:
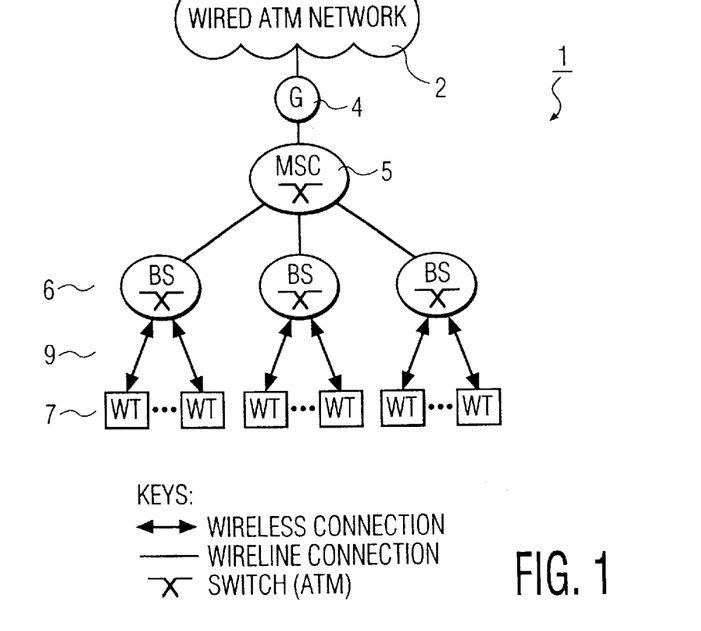
FIG. 1 shows a network, on which the present invention may be implemented, which has a base station architecture and a tree topology.
Figure 2:
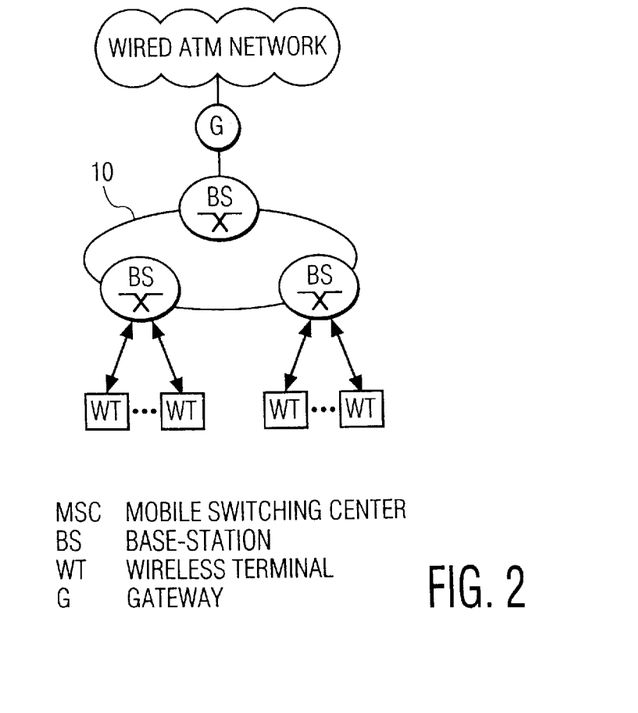
FIG. 2 shows a network, on which the present invention may be implemented, which has a base station architecture and a ring topology.
Figure 3:
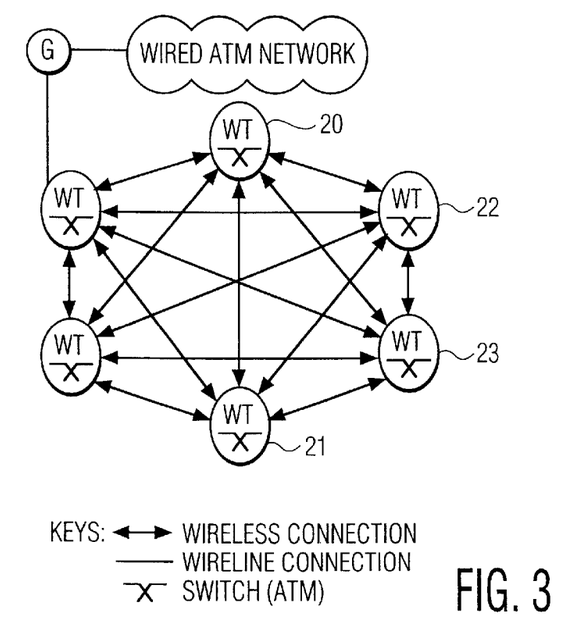
FIG. 3 shows a network, on which the present invention may be implemented, which has an ad-hoc architecture and a fully-connected topology.
Figure 4:
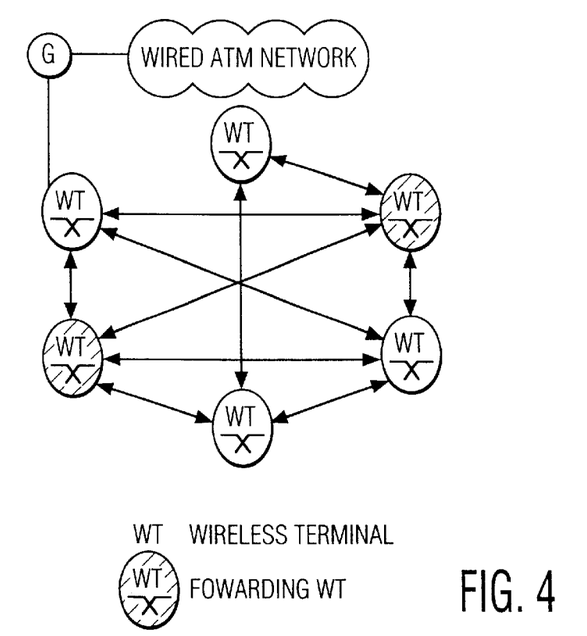
FIG. 4 shows a network, on which the present invention may be implemented, which has an ad-hoc architecture and a forwarding-node topology.

In detail, the foregoing U.S. patent application describes a communications protocol (i.e., the MAC protocol) for wireless ATM networks, which increases network quality of service, particularly in terms of allocated bandwidth, by first reserving and then scheduling resources required for data transmission. FIGS. 1 to 4 show different configurations of wireless ATM networks on which the MAC protocol may be implemented. Specifically, FIGS. 1 and 2 show centralized, or "base station", architectures, in which base stations ("BSs") control communications among various wireless terminals ("WTs"), and FIG. 3 and 4 show distributed, or "ad-hoc", architectures, in which one of the WTs is assigned the task of controlling communications. This particular WT is known as the central controller ("CC").

In both the base station and ad-hoc configurations, communications among the various WTs are effected via a periodic time-division multiple access ("TDMA") frame. In the context of the MAC protocol, this TDMA frame is known as the control-data frame ("CDF"). In general, this CDF includes both a control phase and a data phase, each of which includes plural slots (i.e., time intervals) for transmitting requests and/or data between BSs/CCs and various WTs. In the ATM context, each slot is typically equal to the amount of time required to transmit an ATM cell.

In operation, during the control phase a WT sends a request to a scheduler in a BS/CC via a control slot in the CDF. Generally speaking, this is a request for permission for the WT to transmit data cells to another WT during the data phase of a next CDF. The scheduler gathers all such requests from various WTs, and then allocates available data slots in the next CDF accordingly. That is, the scheduler allocates each data slot to a transmitting WT, such that the transmitting WT is permitted to send data in a particular data slot. Generally speaking, it is not necessary to specify particular receiving WTs, since each of these is provided with a mechanism, e.g., in their ATM layers, to determine whether a cell is addressed thereto, to accept such cells, and to disregard other cells. In any case, once slots are allocated to transmitting WTs, the allocations are broadcast to the various WTs in a "reservation message" which informs each transmitting WT that has submitted a request which data slots in the next CDF it can use to transmit data. Thereafter, in the next CDF, the transmitting WTs transmit data in their assigned slots.

One problem with the foregoing system is that all receiving WTs must remain at full power during the entire CDF, since there may be data at the end of the CDF that is designated for receipt by that WT. While this is generally not a problem in the case of wired terminals, due to the relatively unlimited supply of power from an electrical outlet, this can be problematic in WTs, which are typically battery-powered and, hence, have a limited supply of power. Recognizing this problem, power saving features have been incorporated into existing wireless networks, and into wireless ATM networks in particular. For example, in one conventional system, the BS/CC issues a reservation message specifying which WT is to transmit data to a particular slot, and also which WT is to receive data from a particular slot. With this information in hand, the receiving WTs are able to switch between a low-power (i.e., a "power-saving") mode and a higher power (i.e., "data-receiving") mode, during which data from appropriate slots can be received.

While the foregoing conventional systems can result in power conservation in the WTs, those systems also have significant drawbacks. In particular, they result in an increase in network overhead due to the additional computational effort required on the part of the BS/CC to determine the identities of both the transmitting and receiving WTs. In addition, since each receiving WT is switched between modes individually, the reservation message must include switching information for each individual receiving WT. For example, a typical reservation message may look something like: <transmit_WT_id, time_of_transmission, slot#1, rcv_WT_id1_slot#1, rcv_WT_id2_slot#1, . . . , slot#2, rcv_WT_id1_slot#2, rcv_WT_id2_slot#2, . . . >. Transmission and receipt of a message this complex increases network overhead and thus further decreases network efficiency.

Moreover, the additional processing capabilities required to implement the foregoing power-saving scheme, particularly at the WTs, may require additional power, which counters the amount of power actually saved. For example, the MAC layer at a transmitting WT may be unaware of the intended receiving WTs and, therefore, will need to determine this information via an additional control mechanism between itself and higher layers (e.g., the ATM layer), and by examining the ATM headers of each received packet. In addition, there may be problems with controlling the receiving WTs. For example, if a transmitting WT transmits a large number of slots, only a subset of which are destined to a specific receiving WT, PHY equalization and tracking requirements may not allow that receiving WT to switch itself on and off between specific slots.

In view of the foregoing, there exists a need for a system which reduces power consumption by WTs in a network, and which does so without significantly increasing network overhead.

SUMMARY OF THE INVENTION

The present invention addresses the foregoing needs. In particular, the invention provides various ways of switching specific sets of WTs between a low-power mode, during which relatively little power is consumed, and a data-receiving mode, during which power sufficient to receive and/or process data is consumed. By switching the WTs in sets, rather than individually as in the prior art, the invention is able to reduce the amount of overhead in the BS/CC, the transmitting WTs, and/or the receiving WTs.

According to one aspect, the present invention is a system (e.g., a method, an apparatus, and computer-executable process steps) for transmitting data among plural WTs in a wireless network. In this system, the BS/CC identifies a transmitter and a set of receivers among the plural WTs (e.g., by examining a message from the transmitter which includes that information). The BS/CC then issues a message to the transmitter and to the set of receivers, the message identifying the transmitter, the set of receivers, and a transmission time at which the transmitter transmits the data to the set of receivers. At the transmission time, (i) the transmitter transmits the data to the set of receivers identified in the message, and (ii) the set of receivers switch from a low-power mode to a data-receiving mode (i.e., a mode in which the receivers are powered at a higher level than in the low-power mode) in order to receive the data from the transmitter identified in the message.

The foregoing aspect of the invention reduces the amount of processing that must be performed by the BS/CC. More specifically, in conventional systems the BS/CC controls WTs individually, e.g., by specifying, for each slot in a CDF, a transmitting WT, a receiving WT, and a transmission time. This can be a computationally-intensive task, and thus time consuming. The present invention, on the other hand, specifies a set of WTs, and then controls the set of WTs, rather than each WT individually. This approach is less computationally intensive, and thus faster, without significantly increasing the power consumption of the wireless WTs.

According to another aspect, the present invention is a system for transmitting data among plural WTs in a wireless network. In the system, a BS/CC designates at least one of the plural WTs as a transmitter for outputting data to the wireless network, designates a set of the plural WTs as able to receive data output to the wireless network by the transmitter, and issues a message to the plural WTs identifying the transmitter and the set of plural WTs. When data is output over the wireless network, each of the plural WTs determines whether it is able to receive the data based on the identity of the transmitter. Those of the plural WTs which are able to receive the data switch from a low-power mode to a data-receiving mode in order to receive the data.

The foregoing aspect of the invention thus limits the transmitting WT to transmitting data to a fixed set of receiving WTs. As a result, the transmitting WT is relieved of the task of determining the destinations of its data. That is, in other embodiments, the transmitting WT provides this information to the BS/CC, which then uses this information to allocate/reserve slots in the CDF. Here, since this information is relatively fixed, the transmitting WT (and the BS/CC, for that matter) is freed up for other processing.

According to still another aspect, the present invention is a system for transmitting data between WTs of a wireless network. In this aspect, the BS/CC controls transmission of data from a transmitting WT to plural receiving WTs, where the data is ordered in slots of a CDF, and where each slot is reserved for a data transmission between the transmitting WT and a specific receiving WT. Specifically, the BS/CC divides the plural receiving WTs into sets of power-saving WTs and non-power-saving WTs, and then reserves a set of slots in the CDF for data transmission between the transmitting WT and the non-power-saving WTs, and at least one other set of slots in the CDF for data transmission between the transmitting WT and the power-saving WTs. The BS/CC then issues a message over the wireless network instructing the power-saving WTs when to switch between a low-power mode and a data-receiving mode based on a location of the other set(s) of slots in the frame reserved for data transmission between the transmitter and the power-saving WTs.

By utilizing "fixed" sets, i.e., power-saving and non-power-saving WTs, together with "variable" allocation, i.e., varying when WTs switch between modes based on locations of the sets in slots of a CDF, the invention is able to reduce network overhead. This is particularly true with respect to the transmitting WTs, since the processing required to determine whether any of their current slots are destined for a power-saving or non-power saving WT is significantly less than determining the specific WT to which each slot is addressed. Moreover, because the power-saving WTs are in the data-receiving mode for only a portion of the total CDF, the invention is able to reduce their power consumption without a significant increase in overhead.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENT

The present invention can be used in connection with a variety of different types of wireless networks, including ATM networks which operate under the MAC protocol. Accordingly, while the invention is not limited to use with an ATM network, or to use with the MAC protocol, the preferred embodiments herein will be described in a wireless ATM context which operates under the MAC protocol. To this end, a general overview of the different architectures of wireless ATM networks is provided, followed by a detailed description of the invention in the context of those architectures.

In this regard, wireless ATM networks may have either a distributed architecture or a centralized architecture. FIGS. 1 and 2 show wireless ATM networks which have a centralized, or base station, architecture. There are two different types of topologies which may be implemented in the base station architecture. The first type, shown in FIG. 1, is known as the tree topology. In this topology, packets/cells are passed to the various base stations via a mobile switching center ("MSC"), and thence to the various WTs.

More specifically, wireless ATM network 1 includes, among other things, wired ATM network 2, gateway ("G") 4, mobile switching center ("MSC") 5, base stations ("BS") 6, and WTs 7. Base stations 6, MSC 5, and gateway 4 are typically connected to wired ATM network 2 via fiber optic cables or the like; although wireless connections or electrical cables may be used as well. WTs 7, on the other hand, are connected to base stations 6 via wireless media 9, such as an RF link or an IR link. These WTs can comprise any type of information transmitting and receiving device including, but not limited to, personal computers, digital telephones, video cameras, digital cameras, and digital televisions/settop boxes.

Wired ATM network 2 comprises a conventional ATM network of the type described above, which provides for resource sharing and data cell transfer among its various nodes. Gateway 4 is a port which transmits data cells comprised, e.g., of audio and video data, between wired ATM network 2 and MSC 5. MSC 5 directs data cells received from gateway 4 to appropriate one(s) of base stations 6 based on network addresses in the cell headers, and passes data cells received from base stations 6 through to gateway 4. Base stations 6, which preferably comprise transmitters or the like within a predetermined proximity of their respective WTs, transmit and receive data from WTs with which they have an established connection.

FIG. 2 shows the other well-known base-station topology, namely the ring topology. In the ring topology, the components shown in FIG. 2 are substantially identical to their counterparts in FIG. 1, except that in the ring topology, the switching function is performed distributively rather than via an MSC. That is, switching is performed here by passing cells from base station to base station around "ring" 10, until the cells reach the base station connected to their intended recipient WTs. By utilizing the base stations in this manner, the need for a discrete MSC is eliminated.

In contrast to the base station architecture, the distributed, or ad-hoc, architecture does not use base stations to pass cells to the WTs. Instead, each of the WTs has the ability to perform the switching function of the MSC above, as well as to communicate with the other WTs. FIGS. 3 and 4 show two different topologies which may be used in the ad-hoc architecture. More specifically, FIG. 3 shows the fully-connected topology ("FCT"), in which all WTs are able to communication with each other. This topology, in general, requires high power consumption on the part of the individual WTs, since each WT has to maintain a link with every other WT. FIG. 4 shows the other topology used with ad-hoc networks, namely the forwarding node topology ("FNT"). In the FNT, each WT is not necessarily able to communicate with all other WTs. Rather, certain of the WTs are designated as "forwarding nodes", and these are able to forward cells to their intended destination either directly or via other forwarding nodes.

Communications are effected between WTs in an ATM network, regardless of its architecture, via a TDMA frame. As noted above, in the ATM context, this TDMA frame comprises a CDF, which includes both a control phase and a data phase. The control phase includes plural slots (i.e., time intervals), in which various WTs send their requests to a controlling apparatus (i.e., a BS/CC) for access to a slot in the data phase of a next CDF. The data phase includes slots, in which actual data (e.g., multimedia data) is exchanged between the various WTs.

In the base station architecture, both the control phase and the data phase are implemented in a centralized mode, meaning that both control information and data is routed from a transmitting WT, to a BS, and then to a receiving WT. In the ad-hoc architecture, on the other hand, the control phase may be implemented in either a distributed mode similar to that described above, or in a centralized mode. A centralized control phase can be implemented in the ad-hoc architecture by simplifying the MAC layer protocols, and then incorporating, into every WT, a method of choosing a current CC. This CC may be used to arbitrate access to the various WTs. Specifically, the CC, like the BSs noted above, provides information to WTs as to which WT is supposed to transmit in a particular slot. For example, in the ATM context, the control phase of the CDF is used to specify transmission information to the WTs for the rest of the slots in the CDF. This is described in more detail below.

Figure 5:
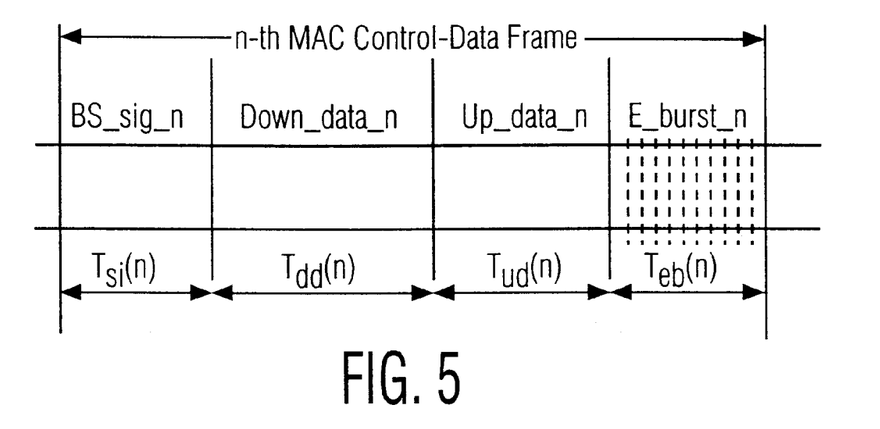
FIG. 5 shows a CDF used with the base station architecture.
Figure 6:
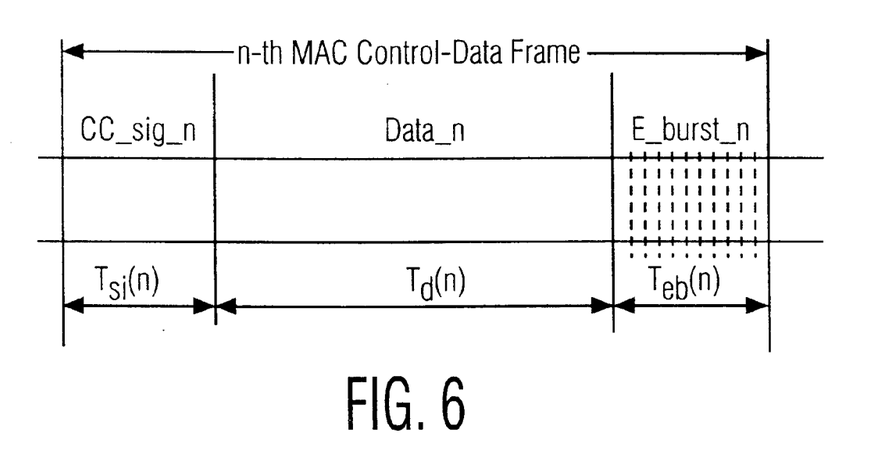
FIG. 6 shows a CDF used with the ad-hoc architecture.

FIG. 5 shows a CDF structure which is used in an ATM network having a BS architecture. As shown in FIG. 5, the CDF includes four phases, namely, (i) BS_sig, (ii) Down_data, (iii) Up_data, and (iv) E-burst. During the BS_sig phase, the BS transmits all of its signaling information to the WTs. Following this signaling phase, the BS sends downlink data in the Down_data phase. This minimizes the turn-around time of the BS, i.e., the time it takes to for a WT to stop and then start transmission. Next, the WTs transmit information in a pre-specified order in the Up_data phase. This transmission can include "piggy-backing" signaling information. During the E-burst phase, all WTs that did not send data in a previous CDF, and that were assigned E-burst slots, will transmit an energy signal at their specific E-burst slot. This energy signal indicates to the BS that a particular WT within that E-burst slot requires bandwidth for transmission of data. As shown in FIG. 6, the CDF for the ad-hoc architecture is similar to that for the BS architecture described above. The main difference between the CDF for the base station architecture and that for the ad-hoc architecture is that the CDF for the base station architecture includes an explicit data phase for the BS, whereas the CDF for the ad-hoc architecture does not include an explicit data phase for the CC.

As mentioned above, the CDFs are used to distribute control information between the WTs and the BS/CC. That is, each WT, during its designated slot, provides its control information to the BS/CC, which control information specifies the number of slots requested by that WT for the next CDF. This control information could also specify a priority for these slots, e.g., by specifying which slots are most critical, followed by less critical slots. The BS/CC collects all of this information from the various WTs, and then allocates slots in the data phase of the next CDF to the requesting WTs based on a number of parameters, including, but not limited to quality of service ("QoS") requirements, available bandwidth, and the like. One method for allocating slots in the CDF is described in U.S. patent application Ser. No. 09/193,435, entitled "System For Establishing A Transmission Sequence For Plural WTs In A Wireless Network", (Inventor: Chiu Yeung Ngo, Assignee: Philips Electronics North America Corp., Assignee Reference: 1504–1335), the contents of which are hereby incorporated by reference into the subject application as if set forth herein in full.

Once the slots are allocated, the BS/CC broadcasts a "reservation message" to the various WTs. This reservation message provides information to the various WTs regarding allocations of the slots in the CDF to the various WTs. Specifically, the reservation message instructs the various WTs as to which slots they may use to transmit data. The present invention groups the WTs in the reservation message based, e.g., on whether they require power conservation (such as battery-powered WTs), and/or provides additional information instructing these WTs when to switch on and off in order to receive data. By doing this, the present invention reduces power consumption in "power-saving" WTs, such as battery-powered laptop computers.

[First Embodiment]

The first embodiment of the invention is a system for transmitting data among plural WTs in a wireless network, which is preferably implemented by computer code (i.e., computer-executable process steps) executing on a processor in the BS/CC. In brief, the BS/CC identifies a transmitter and a set of receivers among the plural WTs, where the transmitter is used to transmit data to the set of receivers. The BS/CC then issues a message to the transmitter and to the set of receivers, the message identifying the transmitter, the set of receivers, and a transmission time at which the transmitter transmits the data to the set of receivers. At the transmission time, (i) the transmitter transmits the data to the set of receivers identified in the message, and (ii) the set of receivers switch from a low-power mode to a data-receiving mode (i.e., a mode in which the receivers are powered at a higher level than in the low-power mode) in order to receive the data from the transmitter identified in the message.

Figure 7:
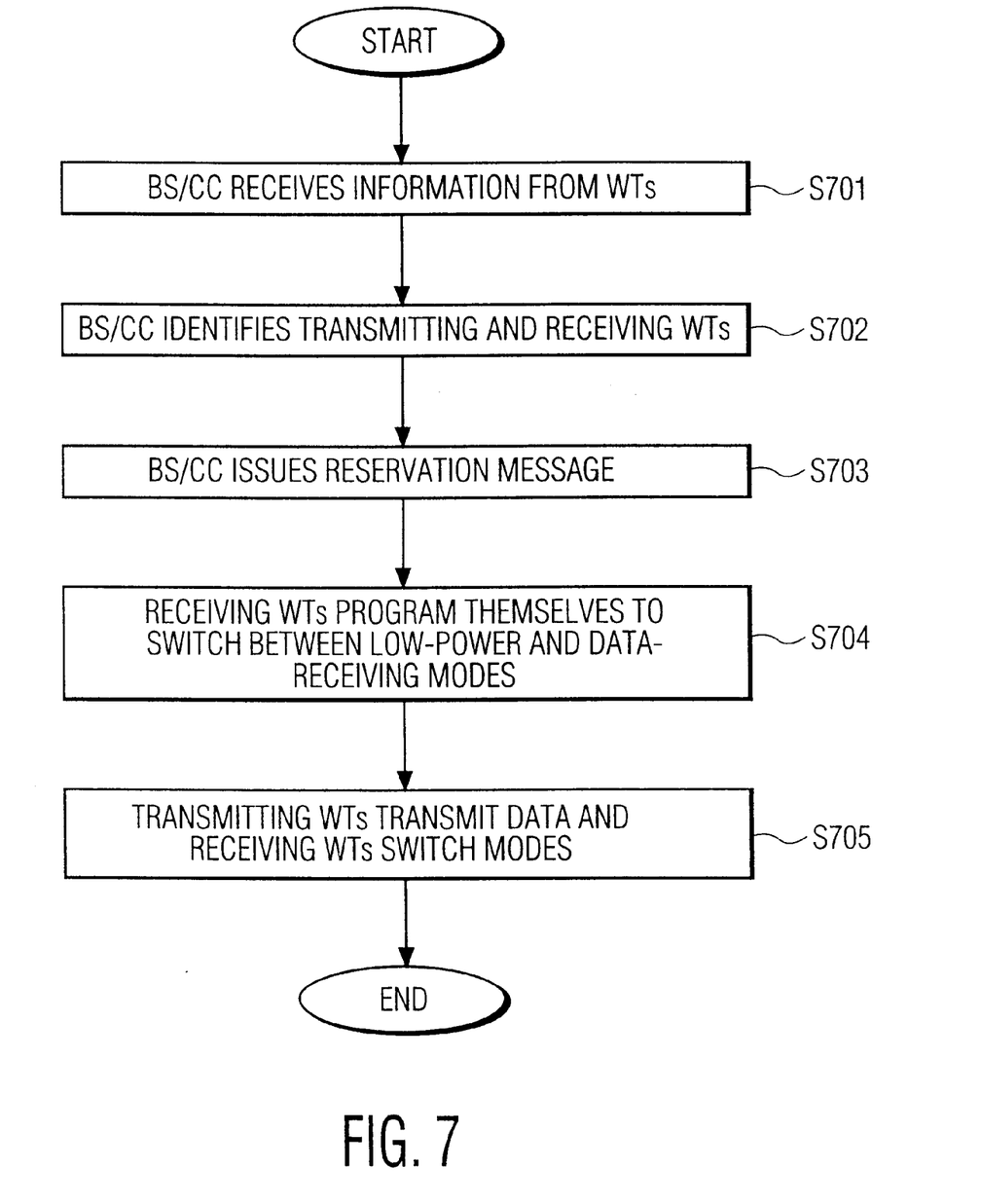
FIG. 7 is a flow diagram showing process steps for implementing the first embodiment of the invention.

FIG. 7 is a flow-diagram which depicts the operation of the foregoing system in more detail. More specifically, in step S701, the BS/CC receives information from the various WTs in the control phase of the CDF. This "control information" includes transmission requests from the various WTs. These transmission requests comprise requests by the various WTs to transmit data from one WT (i.e., a transmitter or transmitting WT) to one or more other WTs (i.e., receivers or receiving WTs). Once these requests are received, the BS/CC examines information in the requests in order to determine how to allocate slots in the next CDF.

More specifically, in step S702, the BS/CC identifies which of the WTs have requested slots for transmission, and to which WTs these transmitters wish to transmit data. To do this, the BS/CC examines the requests for WT identifiers (e.g., a "WT_id") which identify both transmitting WTs and intended recipient WTs. The BS/CC also determines the number of slots that each has requested per receiving WT. Processing then proceeds to step S703.

In step S703, the BS/CC issues a reservation message to the WTs identifying the transmitting and receiving WTs. For each transmitting WT, the reservation message also identifies which slots in the next CDF are allocated thereto, together with a list of receiving WTs. In the preferred embodiment of the invention, at least one slot in the CDF is allocated to each receiving WT in this list. The reservation message also includes a transmission time. This transmission time identifies a time at which the transmitting WTs begin and/or end transmission of data to the receiving WTs in the list. Hence, a reservation message output by the BS/CC in step S703 may comprise <transmit_WT_id, time_of_transmission, number of slots, rcv_WT_id1, rcv_WT_id2 . . . >, where transmit_WT_id comprises an identifier for the transmitting WT, rcv_WT_idn comprises an identifier for an $n^{th}$ receiving WT, time_of_transmission comprises the transmission time, and number of slots comprises the number of slots being transmitted by the transmitting WT. Each transmitting and receiving WT then receives the reservation message and operates as instructed.

More specifically, in step S704, each receiving WT "programs itself" (e.g., programs an interrupt) to switch from a low-power mode to a data-receiving mode at the transmission time. This low-power mode does not constitute a "power-off" state. Rather, in the low-power mode, a relatively small amount of power is consumed by the WTs, generally enough to keep track of the time, and to accept and interpret the reservation message from the transmitter. In preferred embodiments of the invention, the transmission time comprises both a "start-of-transmission" time and an "end-of-transmission" time. Thus, receiving WTs already in the low-power mode program themselves to "wake up" at the start-of-transmission time (i.e., to go from the low-power mode to the data-receiving mode) in order to receive data, and then to reenter the low-power mode at the end-of-transmission time. In cases where the transmission time comprises the end-of-transmission time only, WTs already in the data-receiving mode will enter the low-power mode at the transmission time.

Next, in step S705, at the transmission time, the transmitting WTs transmit data to the receiving WTs. In cases there the WTs are in the low-power mode already, the receiving WTs switch from the low-power mode to the data-receiving mode in order to receive data from the transmitting WTs. By operating in the low-power mode when they are not receiving data, the receiving WTs are able to conserve power without any substantial adverse affects on the system. Once they are finished receiving data, the receiving WTs may then reenter the low-power mode (if required by the transmission time). In cases where the WTs are already in the data-receiving mode and the transmission time specifies the end-of-transmission time only, in step S705 the WTs remain in the data-receiving mode until the end-of-transmission time and then enter the low-power mode. The process steps shown in FIG. 7 are repeated for each transmission.

[Second Embodiment]

The second embodiment of the invention is a system for transmitting data among plural WTs in a wireless network, which is preferably implemented by computer code (i.e., computer-executable process steps) executing on a processor in the BS/CC. In brief, this embodiment of the invention includes code to designate at least one of the plural WTs as a transmitter for outputting data to the wireless network, to designate a set of the plural WTs as able to receive data output to the wireless network by the transmitter, and to issue a message to the plural WTs identifying the transmitter and the set of plural WTs. When data is output over the wireless network, each of the plural WTs determines whether it is able to receive the data based on the identity of the transmitter. Those of the plural WTs which are able to receive the data switch from a low-power mode to a data-receiving mode in order to receive the data.

Figure 8:
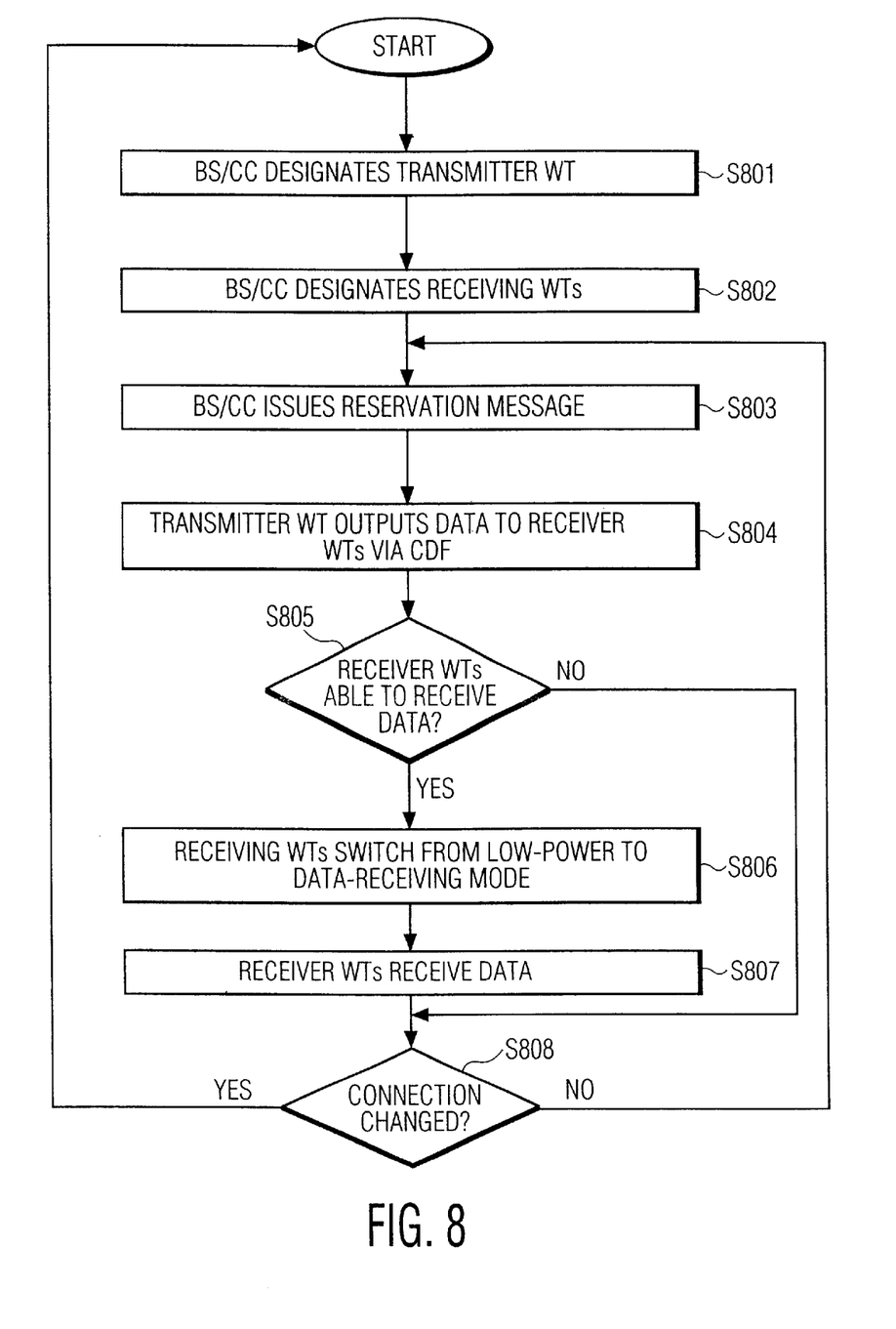
FIG. 8 is a flow diagram showing process steps for implementing the second embodiment of the invention.

FIG. 8 is a flow-diagram which depicts the operation of the foregoing system in more detail. In steps S801 and S802, respectively, the BS/CC designates a WT to be a transmitter and designates specific receiving WTs for that transmitter. More specifically, in step S801, the BS/CC designates one of the plural WTs as being the transmitting WT. In step S802, the BS/CC designates a set of the WTs as being able to receive data only from the transmitting WT designated in step S801. For example, in many wireless networks, one WT will have connections with only a small number of other WTs (i.e., less than the total number of other WTs in the network). Thus, in step S802, the receiving WTs may be designated as all WTs in the network which have connections to the transmitting WT.

Next, in step S803, the BS/CC issues a reservation message to all WTs in the network. This message identifies the transmitting WTs and the receiving WTs, as well as which receiving WTs are able to transmit data to which receiving WTs. This information is stored in a memory on each WT and in a memory on the BS/CC. In the preferred embodiment of the invention, the reservation message is transmitted once, and is re-transmitted only when connections between the various WTs in the network change (e.g., a new connection is made or an old connection is dropped). This beneficially affects the processing speed of the network. Of course, the invention can also be configured to re-transmit the reservation message each time the BS/CC transmits data in a CDF, in order to ensure the proper assignment of each WT.

Next, in step S804, a transmitting WT outputs data to a receiving WT via the CDF. This data includes, among other things, information identifying the transmitting WT itself (e.g., the transmit_WT_id, noted above). Already in the low-power mode, the receiving WTs determine, in step S805, whether they are able to receive data. Specifically, each receiving WT determines whether it is able to receive data based on whether that data was transmitted by a transmitting WT designated for that receiving WT. For example, with reference to FIG. 3, if WT 20 is the designated transmitter for WTs 21, 22 and 23, in step S805, each of these WTs will determine whether the data was transmitted from WT 20 (as opposed to another transmitter).

Thereafter, processing proceeds to step S806, in which those WTs which are able to receive the data switch from the low-power mode to a data-receiving mode. In step S807, those WTs then receive the data, whereafter they switch back to the low-power mode, or remain in a data-receiving/ higher-power mode, depending upon whether the received data is to be processed. Thus, in the case of WTs 21, 22 and 23, in step S806, these WTs switch from the low-power mode to the data-receiving mode, whereafter, in step S807, these WTs receive the data transmitted by transmitting WT 20. The processing shown in FIG. 8 then proceeds to step S808, which determines if connections have changed. If so, processing returns to step S801; otherwise processing returns to step S803, whereafter the foregoing is repeated.

[Third Embodiment]

The third embodiment of the invention is a system for transmitting data between WTs of a wireless network, which is preferably implemented by computer code (i.e., computer-executable process steps) executing on a processor in the BS/CC. In the invention, the BS/CC controls transmission of data from a transmitting WT to plural receiving WTs, where the data is ordered in slots of a CDF, and where each slot is reserved for a data transmission between the transmitting WT and a specific receiving WT. Specifically, the BS/CC divides the plural receiving WTs into sets of power-saving WTs and non-power-saving WTs, and then reserves a set of slots in the CDF for data transmission between the transmitting WT and the non-power-saving WTs, and at least one other set of slots in the CDF for data transmission between the transmitting WT and the power-saving WTs. The BS/CC then issues a message over the wireless network instructing the power-saving WTs when to switch between a low-power mode and a data-receiving mode based on a location of the at least one other set of slots in the frame reserved for data transmission between the transmitter and the power-saving WTs.

Figure 9:
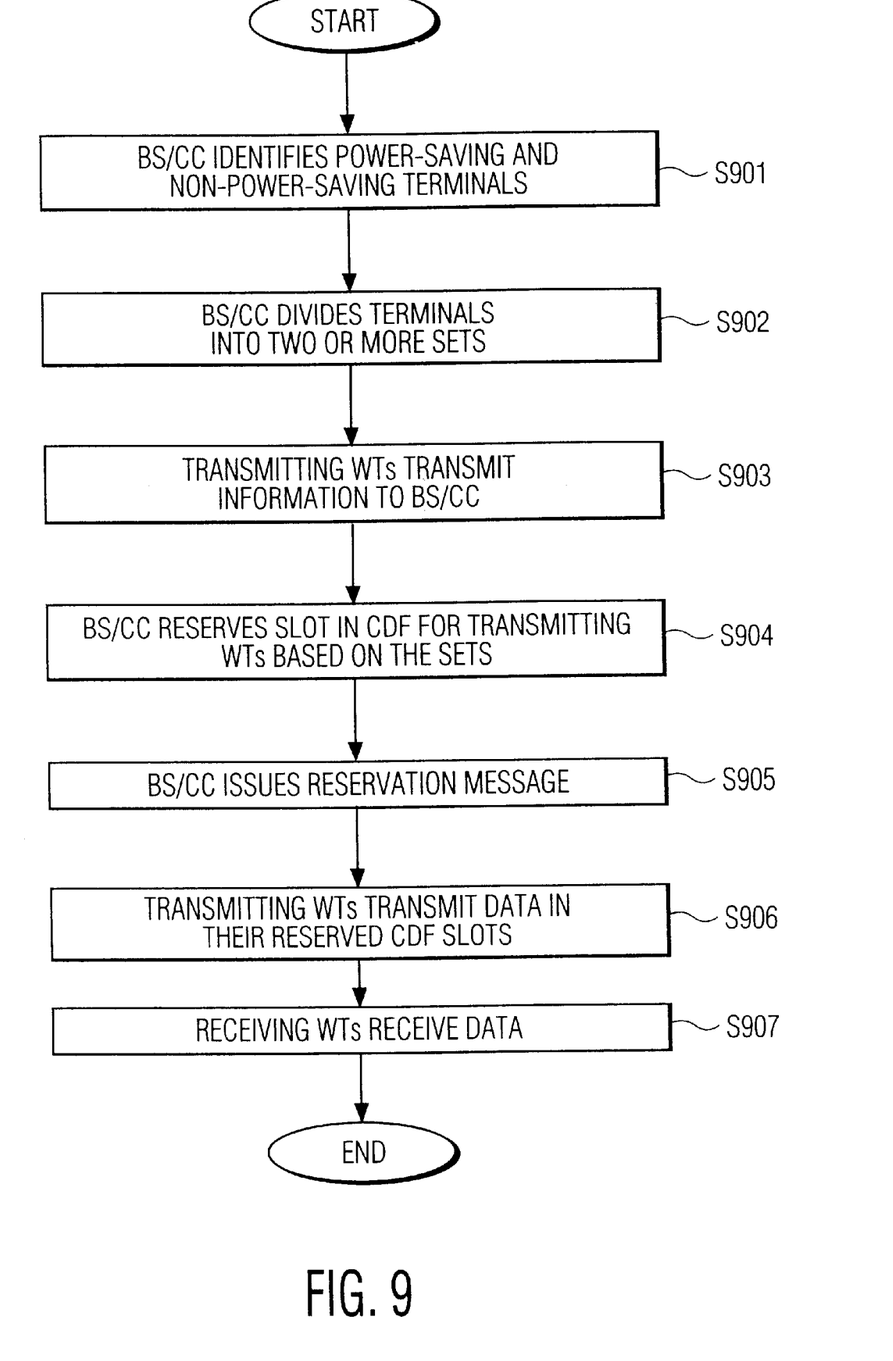
FIG. 9 is a flow diagram showing process steps for implementing the third embodiment of the invention.

FIG. 9 is a flow-diagram which depicts the operation of the foregoing system in more detail. More specifically, in step S901, the BS/CC determines which terminals in a network comprise power-saving WTs (generally those with a limited power supply, such as battery-powered laptops, or the like) and which comprise non-power-saving WTs (generally those with an unlimited power supply). This determination can be made based on pre-stored information or by querying the individual terminals.

Thereafter, step S902 divides the WTs into two or more sets. In preferred embodiments of the invention, these sets comprise simply power-saving WTs and non-power-saving WTs. Of course, it should be noted that the invention is not limited to dividing the WTs in this manner, and that the terminals may be divided according to any desired criteria. Moreover, it is noted that the invention is not limited to dividing the WTs into simply two sets. For example, an additional criterion, such as a terminal data reception rate (which also may be determined as in step S901), may also be taken into account when dividing the WTs into sets. Thus, in step S902, the BS/CC may divide the WTs as follows:

$A_1$=set of all power-saving WTs with a data_rate<$D_1$;

$A_2$=set of all power-saving WTs with $D_1 \leq$ data_rate<$D_2$;

$A_i$=set of all power-saving WTs with $D_{(i-1)} \leq$ data_rate $\leq D_i$;

$A_N$=set of all power saving WTs with data_rate$\geq D_N$; and $A_{(N+1)}$=set of all other WTs, where the total number of WTs is defined as $$WT_{total} = A_1 + A_2 + \ldots + A_N A_{(N+1)}.$$

Following step S902, in step S903 the transmitting WTs transmit information to the BS/CC. This information includes the number of slots requested for transmission, as well as where the data in those slots is destined. For instance, in the simple power-saving/non-power-saving WT division described above, the information will identify which data is destined for the power-saving WTs, and which data is destined for the non-power saving WTs. The information is generally provided in the up-link slot for each transmitting WT. However, a GFC field within an ATM cell header could also be used to specify the information.

Next, in step S904 the BS/CC reserves a set of slots in the CDF for data transmission between each transmitting WT and the non-power-saving WTs, and at least one other set of slots in the CDF for data transmission between each transmitting WT and the power-saving WTs, subject, of course, to the limited number of slots available in the CDF. That is, the BS/CC collects all slots that are addressed to any power-saving WT into one section of the CDF. For the "data rate" example provided above, the BS/CC will collect all slots for set $A_1$ into one section of the CDF, all slots for set $A_2$ into another section of the CDF, all slots for set $A_i$ into yet another section of the CDF, all slots for set $A_N$ into yet another section of the CDF, and all slots for set $A_{(N+1)}$ into yet another section of the CDF.

The invention is not limited to ordering the sections in the CDF in any particular way. Thus, power-saving WTs may be at the beginning of the CDF, followed by the non-power-saving WTs, or vice versa. The same goes true for sets $A_1$ to $A_N$ above. For example set $A_2$ may come first, followed by $A_1$, followed by $A_N$, etc. Of course, there may be inherent advantages to particular orderings. Such advantages are noted below.

Following step S904, processing proceeds to step S905. In step S905, the BS/CC issues a reservation message over the wireless network to the WTs. In the reservation message, the BS/CC instructs the WTs as to the slot reservations made in step S903. The reservation message also instructs power-saving WTs when to switch between a low-power mode and a data-receiving mode based on locations of sets of slots in the CDF. That is, in this embodiment, the BS/CC specifies a "start-of-transmission" and/or an "end-of-transmission" time, which define the starting and ending of a data transmission.

These times are used by the receiving WTs to switch between a low-power mode and a data-receiving mode. That is, in cases where the WTs are already in the low-power mode, both a start-of-transmission and an end-of-transmission time will be specified, in order to bring the WT from the low-power mode to the data-receiving mode and then back to the low-power mode. Of course, in this case, the WT need not necessarily return to the low-power mode, particularly if the data requires immediate further processing.

On the other hand, in cases where the WTs are already in the data-receiving mode, only the end-of-transmission time need be specified, since that will denote the time at which the WTs are to enter the low-power mode. Thus, for example, in an ad-hoc network, all transmissions addressed to power-saving WTs can be "bunched together" at the beginning of the CDF, and hence only the end-of-transmission time for the power-saving WTs need be specified. Also, in the particular case of an ad-hoc network, all slots allocated in response to E_burst requests are assumed to be addressed to power-saving terminals, since the addressing of these slots is not known a priori. In the case of a base station network, where the Down_data phase occupies the majority of the CDF, the BS itself can divide all cell transmissions into two parts, one addressed to power-saving WTs and the other addressed to non-power saving WTs. Then, the BS may treat itself as "two" different WTs, in which case the BS splits its transmissions into two parts by transmitting some slots in the Down_data phase and some in the Up_data phase. During each of these phases, the BS/CC may also specify which slots are allocated to power-saving WTs and which are allocated to non-power-saving WTs, and then specify "start-of-transmission" and/or "end-of-transmission" times therefor.

Next, in step S906, the WTs receive the reservation message, and the transmitting WTs transmit data in their respective reserved slots of the CDF. For instance, in the "data rate" example provided above, this data may comprise <number_of_slots_for set $A_1$, number_of slots_for _set_$A_2$, . . . number of_slots_for_set_$A_N$, number_of_slots_for_set_$A_{(N+1)}$>.

In step S907, each receiving WT belonging to a particular set receives data during its phase, which phase is defined by the "start-of-transmission" and/or "end-of-transmission" times provided by the BS/CC. For example, power-saving WTs receive data during the "power-saving phase" of the CDF and non-power-saving WTs receive data during the "non-power-saving phase" of the CDF. Likewise, in the "data rate" example, the WTs in $A_1$ receive data during the $A_1$ phase of the CDF, the WTs in $A_2$ receive data during the $A_2$ phase of the CDF, etc. At other times (i.e., when not receiving data), the WTs enter the low-power mode. At this point, it is noted that in this embodiment, the non-power-saving WTs generally do not enter the low-power mode, since there is no need. Of course, the invention could also be configured so that these WTs enter the low-power mode as well. After step S907, processing ends; however steps S903 to S907 are repeated for each transmission.

Alternatively, the third embodiment could be configured so that, in step S903, the transmitting WT specifies a number of slots and a set number (<number_of_slots, set_number>), where the set number is chosen as follows: choose $A_i$ if there is at least one packet addressed to any set within $A_i$, and no packets addressed to any of sets $A_1$ to $A_{i-1}$. In this case, in step S904, the BS/CC reserves slots of all the WTs that specified set number $A_1$ in one area of the CDF, slots of all WTs that specified set number $A_2$ in another area of the CDF, etc. The BS/CC may then issue, in step S905, a reservation message such as <WT_id><no_of_slots>. . . <set_$A_1$begin_time><set_$A_1$_end_time><set_$A_2$_begin_time><set_$A_2$_end_time>. . . <set $A_N$begin_time><set_$A_N$_end_time>. Thereafter processing proceeds in the same manner as before.

In this regard, it is noted that elements of the three embodiments described above can be combined in any manner, as one of ordinary skill in the art would recognize once armed with the subject disclosure. For example, it is possible to implement the first and/or third embodiment on the "fixed" sets of the WTs specified in the second embodiment, e.g., by specifying power-saving sets in the fixed sets. Moreover, it is noted that the invention is not limited to the context described herein, i.e., a wireless ATM network using the MAC protocol and having an ad-hoc or base station architecture. That is, the invention can be used with any network, wireless or not, which organizes data transmissions in TDMA frames. Finally, it noted that the process steps shown in FIGS. 7, 8 and 9 need not necessarily be executed in the exact order shown, and that the order shown is merely one way for the invention to operate. Thus, other orders of execution are permissible, so long as the functionality of the invention is substantially maintained.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A method of transmitting data among plural terminals in a wireless network, the method comprising:

designating at least one of the plural terminals as a transmitter, the transmitter for outputting data to the wireless network;

designating a set of the plural terminals as able to receive data output to the wireless network by the transmitter;

issuing a first message to the plural terminals identifying the transmitter and the set of plural terminals;

receiving a request for transmission from the transmitter; and issuing a second message to the plural terminals that identifies the transmitter;

wherein, each of the plural terminals determines whether it is able to receive the data based on the second message that identifies the transmitter; and wherein those of the plural terminals which are able to receive the data are enabled to receive the data, and at least one of those of the plural terminals that are not able to receive the data is enabled to enter a low-power mode.

2. A method according to claim 1, wherein the set of the plural terminals comprises terminals that have established connections to the transmitter.

3. A method according to claim 2, further comprising re-issuing the first message each time connections among the plural terminals change.

4. A method according to claim 1, wherein:

each of the plural terminals includes a corresponding terminal identifier; and each of the plural terminals determines whether it is able to receive the data based on the corresponding terminal identifier of the transmitter.

5. A system for transmitting data among plural terminals in a wireless network, the system comprising:

a controlling apparatus that is configured to:
(i) designate at least one of the plural terminals as a transmitter, the transmitter for outputting data to the wireless network,
(ii) designate a set of the plural terminals as able to receive data output to the wireless network by the transmitter,
(iii) issue a first message to the plural terminals identifying the transmitter and the set of plural terminals,
(iv) receive a request for transmission from the transmitter; and
(v) issue a second message to the plural terminals that identifies the transmitter;

wherein:

each of the plural terminals determines whether it is able to receive the data based on the second message that identifies the transmitter; and those of the plural terminals which are able to receive the data are enabled to receive the data and one or more of the plural terminals that are not able to receive the data are enabled to enter a low-power mode.

6. A system according to claim 5, wherein the set of plural terminals comprises terminals that have established connections to the transmitter.

7. A system according to claim 6, wherein the controlling apparatus is further configured to re-issue the first message each time connections among the plural terminals change.

8. A system according to claim 5, wherein each of the plural terminals includes a corresponding terminal identifier; and wherein each of the plural terminals determines whether it is able to receive the data based on the corresponding terminal identifier of the transmitter.

* * * * *